Sept. 17, 1946.        D. H. CLARK              2,407,628
                    BEAD DISPENSER CONTROL
           Original Filed July 24, 1942    2 Sheets-Sheet 1
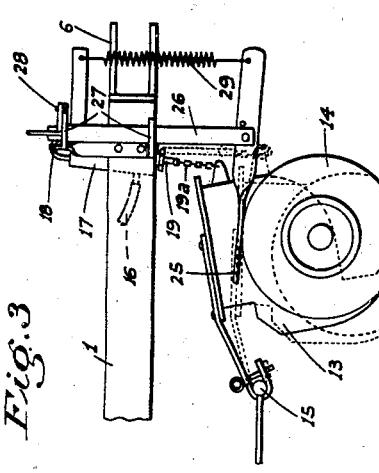
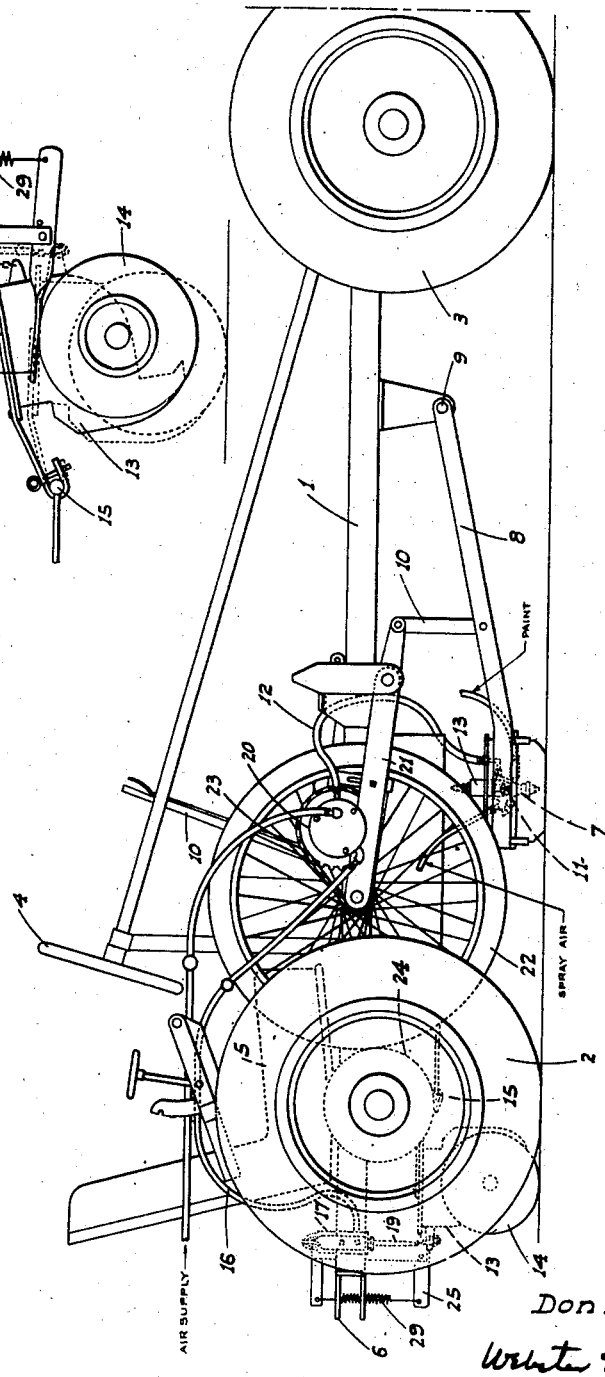
INVENTOR
Don H. Clark
ATTYS

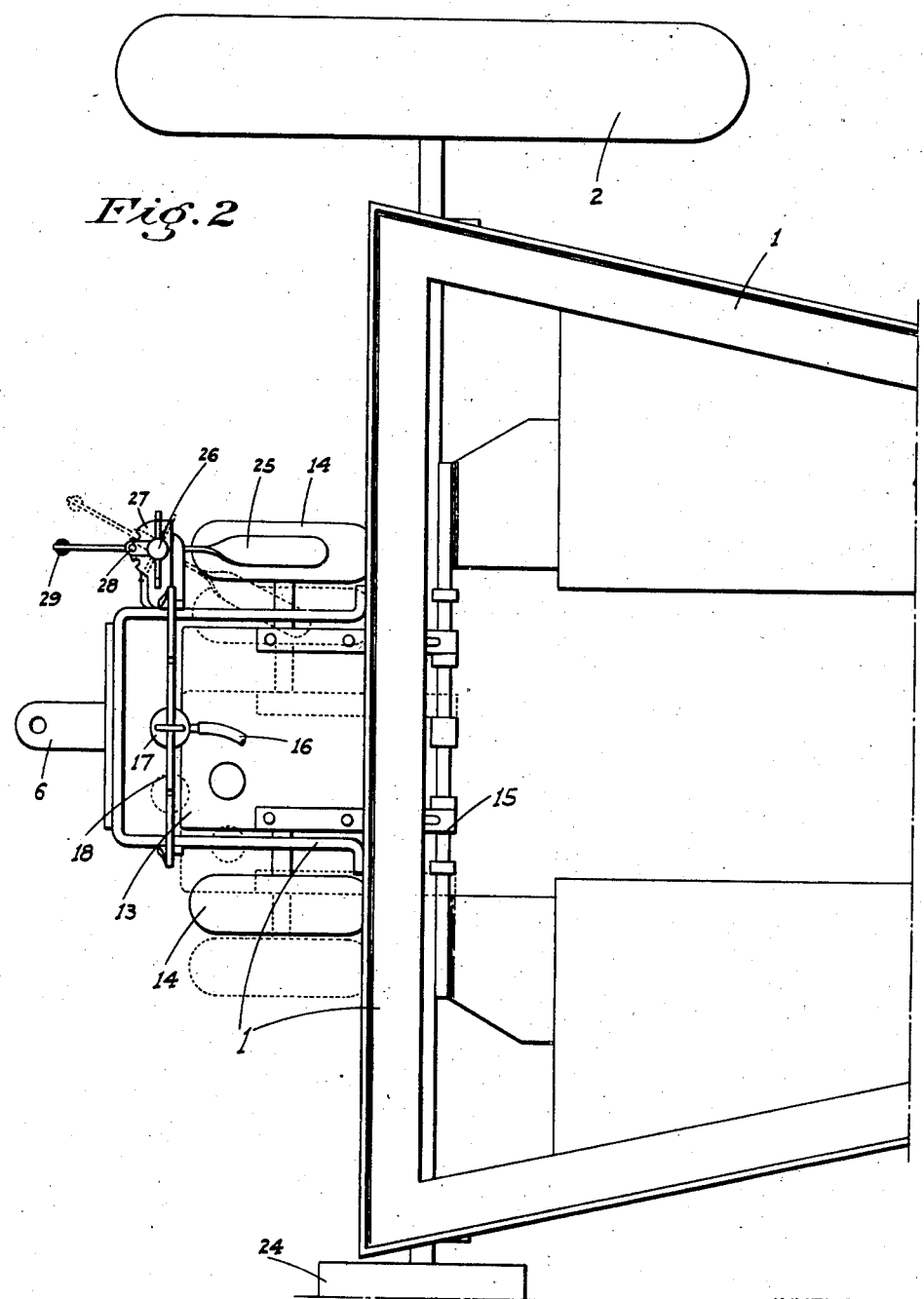

Patented Sept. 17, 1946

2,407,628

UNITED STATES PATENT OFFICE 2,407,628

BEAD DISPENSER CONTROL

Donald H. Clark, Stockton, Calif.

Original application July 24, 1942, Serial No. 452,162. Divided and this application June 30, 1944, Serial No. 543,039

4 Claims. (Cl. 275—2)

This invention relates to bead dispensing devices for road-stripe painting machines, and is a division of my copending application, Serial No. 452,162, filed July 24, 1942 (issued as Patent No. 2,357,930, Sept. 12, 1944).

In connection with the stripe application or painting, glass beads are frequently applied on the stripes at intervals; the bead dispenser being mounted on the same machine as the paint applicator, in trailing relation thereto, the dispenser functioning automatically with the advance of the machine.

The dispenser includes wheels adapted for road engagement and whose rotation causes the dispenser to function, so that upon lifting of the wheels from the road, the bead dispensing operation ceases.

It is desirable that the timing of the bead dispensing (and which is controlled by wheel rotation) shall not be disturbed by raising of the dispenser and wheels, and which would occur if the wheels continued to rotate.

It is therefore the major object of the present invention to provide a brake acting positively and automatically to prevent rotation of the wheels when they are lifted from the road. The dispenser, together with its wheels, is adjustable laterally of the main frame of the striping machine, whereas the brake is of necessity mounted on said main frame.

A further object of this invention is to mount the brake so that it may properly engage a wheel irrespective of the lateral adjustment of the dispenser.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of a stripe painting machine as in operation, the conduits leading to the paint spray gun and bead dispenser cylinder being shown somewhat diagrammatic, and only those conduits which are essential to an understanding of the invention being shown.

Figure 2 is a fragmentary top plan showing the mounting of the bead dispenser and its associated air lift cylinder and brake.

Figure 3 is a fragmentary side elevation showing the bead dispenser, air lift cylinder, and brake unit.

Referring now more particularly to the characters of reference on the drawings, the machine comprises a horizontal frame structure 1 supported at its rear end by a pair of pneumatic-tired wheels 2 and at the front end by a pair of steerable wheels 3. Steering of the latter is controlled from a steering wheel 4 mounted on the frame convenient to the operator's seat 5, also mounted on the frame adjacent its rear end. The machine is not self-propelled, but is adapted to be pushed ahead by a vehicle attached to a rear end clevis 6 on the machine, such vehicle, as usual, having a paint supply and air compressing unit thereon.

A number of paint spray guns 7 are supported in fixed connection with the rear end of an arm unit 8 which extends forwardly to pivotal connection with the frame 1, as at 9, so that the guns may give vertically and also be lifted clear of the road; such lifting being effected by any suitable means, such as a lever and link mechanism, indicated at 10.

The guns are of a standard type commonly used in highway striping work, the feeding of the paint onto the road from each gun taking place only upon the opening of a needle valve 11 in the gun, and such needle valve is opened upon admission of compressed air from a conduit 12 leading to a cylinder 13 at the top of the gun, and to the piston rod of which gun the needle valve is connected.

Disposed between the wheels 2 rearwardly of the gun unit is a bead dispenser 13, also of standard type and supported on road-engaging wheels 14, the rotation of which controls the dispensing of the beads in predetermined quantity. The dispenser is pivoted at its forward end in connection with the frame 1, as at 15, so that it may be swung vertically and lifted clear of the ground; and such lifting is effected by the admission of air pressure from a conduit 16 to an air cylinder 17 hung on a frame-mounted crossbar 18 above the dispenser and whose piston rod 19 is connected to the dispenser at its rear end by means of a chain link 19a or the like, so that the dispenser is free to yield vertically when engaged with the road.

The above type of road-striping machine and the general arrangement of parts, except for the dispenser lift device, is standard equipment, and I do not change the same. The flow of air to the cylinder 19, as well as to the paint gun, is automatically controlled by the means shown in said copending application. This means includes a rotary air control valve 20, to which conduits 12 and 16 lead in proper relation. This valve is mounted on a vertically adjustable swing arm 21 mounted on one side of frame 1 and which carries a yieldable-periphery wheel 22. This wheel is connected to the rotor of valve 20 by a suitable chain or similar drive 23, and the wheel itself is rotated, upon advance of the machine, by contact with a drum 24 fixed with the adjacent wheel 2. The relative sizes of the drum, wheel 22, and chain drive 23 are such that the valve is operated to alternately admit and release air to and from conduits 12 and 16 at predetermined intervals relative to the movement of the machine along the road. The conduits 12 and 16 are connected to the valve at such points relative to the direction of rotation of the rotor as to cause the bead dispenser to start operations (by being lowered upon the release of air from cylinder 17) a predetermined and proper time after the stripe painting is begun.

When the bead dispenser is raised, it is desirable that the timing of the bead dispensing, which is controlled by rotation of the wheels 14, shall not be disturbed. I therefore provide a flat brake strip 25 above one wheel 14 in position to be engaged thereby when the dispenser is lifted (see Fig. 3). This strip is pivoted intermediate its ends on a horizontal axis, on a vertical stem 26 turnable in brackets 27 projecting from the adjacent portion of frame 1. This stem is normally prevented from rotation by a releasable holding pin 28 between the stem and a quadrant formed on the upper bracket 27 (see Fig. 2). A tension spring 29 between the free end of the strip 25 and the stem resists upward movement of said strip. Rotation of the stem, which causes the brake strip to swing also, is necessitated by reason of the fact that the bead dispenser is, as usual, arranged for lateral adjustment on the machine to one side or the other of a normal central plane, as the lateral position of the stripe being painted may require. By the means above described the brake strip may be disposed directly above the wheel 14 in operating relation thereto, regardless of the lateral position of the dispenser to one side or the other of its normal central plane.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a road striping machine, a bead dispenser including road engaging wheels, the rotation of one of which controls the bead dispensing operation, means mounting the dispenser for lateral adjustment and independent lifting movement to raise the wheels clear of the ground, means to thus lift the dispenser, and a brake element adapted to be maintained in relatively fixed position above said one wheel to engage the same upon lifting of the dispenser irrespective of the laterally adjusted position of the dispenser.

2. In a road striping machine, a bead dispenser including road engaging wheels, the rotation of one of which controls the bead dispensing operation, means mounting the dispenser for lateral adjustment and independent lifting movement to raise the wheels clear of the ground, means to thus lift the dispenser, a relatively fixed brake element disposed in a horizontal plane above the top of said wheel when the latter is in a ground engaging position, and means mounting said element for lateral adjustment to dispose the same in the path of upward movement of said wheel for engagement thereby irrespective of the laterally adjusted position of the wheel.

3. A device as in claim 2, in which the brake element comprises a horizontally extending member and said last named means includes a stem on which the member beyond the brake element is mounted, the stem being spaced horizontally from the axial plane of the wheels, and means mounting the stem on the machine for adjustable rotation about a vertical axis.

4. In a road striping machine, a bead dispenser including road engaging wheels, the rotation of one of which controls the bead dispensing operation, means to lift the dispenser and wheels clear of the ground, a brake element above the wheel, a horizontal member rigid with and projecting from the element, a horizontal pivot mounting for said member supported from the machine, and a spring acting on the member to yieldably resist upward movement of the brake element.

DONALD H. CLARK.